United States Patent [19]

Borzak

[11] 4,122,945
[45] Oct. 31, 1978

[54] TAPE REEL CONTAINER

[75] Inventor: Robert A. Borzak, Opelika, Ala.

[73] Assignee: Ampex Corporation, Redwood City, Calif.

[21] Appl. No.: 893,287

[22] Filed: Apr. 5, 1978

[51] Int. Cl.² .................. B65D 5/38; B65D 85/67
[52] U.S. Cl. ........................ 206/395; 206/493; 229/20
[58] Field of Search ............... 206/45.14, 310, 387, 206/395–397, 408, 474–475, 493, 565; 229/9–11, 19–20

[56] References Cited

U.S. PATENT DOCUMENTS

| 3,332,600 | 7/1967 | Guernsey | 229/20 |
| 3,541,052 | 11/1970 | Kirk | 206/395 X |

FOREIGN PATENT DOCUMENTS 440,118  12/1967  Switzerland ................. 206/395

Primary Examiner—Steven E. Lipman
Attorney, Agent, or Firm—Robert G. Clay; Charles M. Carman, Jr.

[57] ABSTRACT

A tape reel container of the carton type having one open side for the insertion and withdrawal of a reel-holding insert. The insert has a first spine and two flaps bracketing the reel and holding it by means of two opposed spindles extending respectively from the flaps and into the reel hub openings; and a second spine and smaller flap is provided to close the open side of the carton, the smaller flap being easily withdrawn to identify the contents.

5 Claims, 4 Drawing Figures

U.S. Patent     Oct. 31, 1978     4,122,945
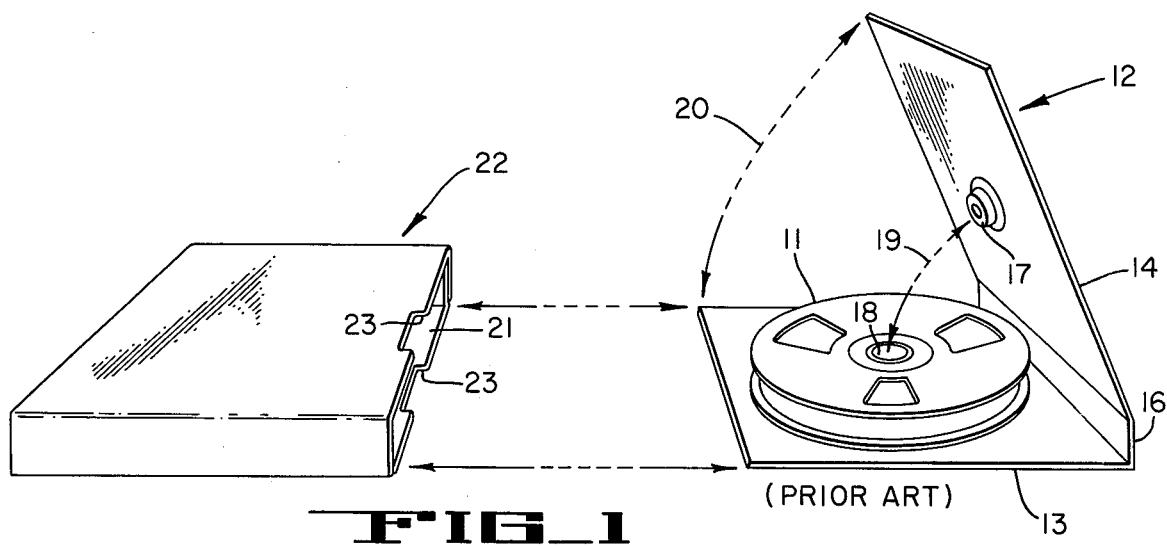
FIG_1 (PRIOR ART)
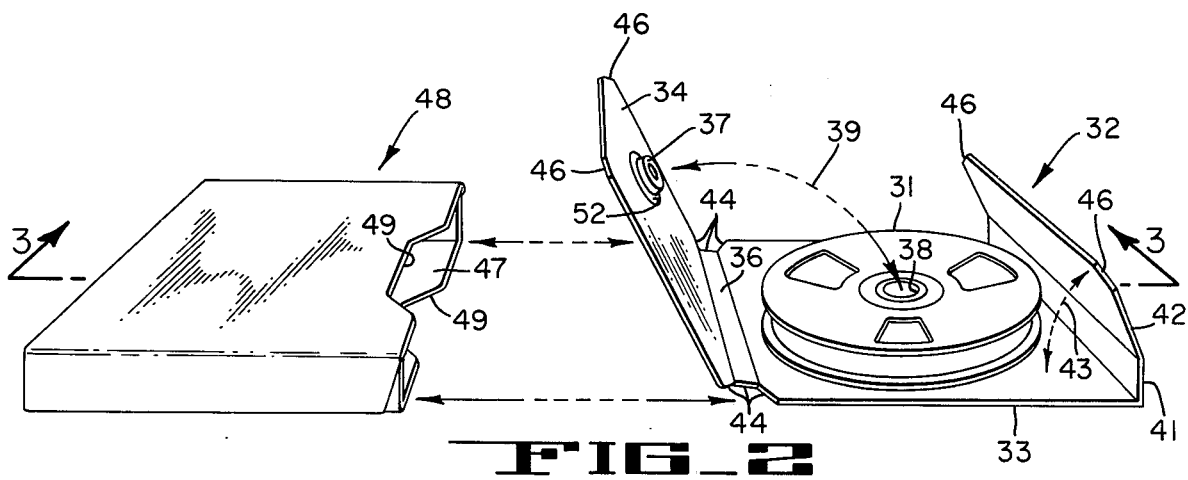
FIG_2
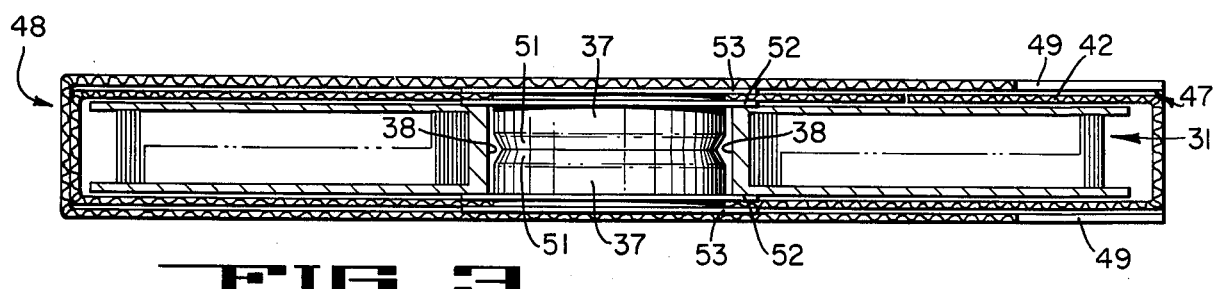
FIG_3
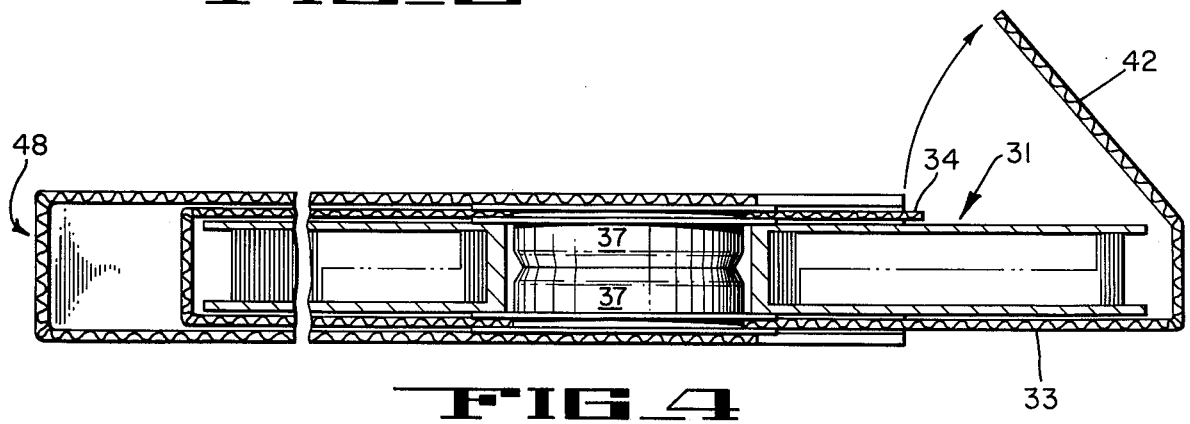
FIG_4

4,122,945

TAPE REEL CONTAINER

BACKGROUND OF THE INVENTION

This invention relates to reel containers and particularly to such containers having reel-holding inserts.

Previously in the art, reels have been shipped in containers of widely varying types, but including particularly the carton type having one open side for insertion and withdrawal of an insert comprising a spine and two flaps bracketing a reel, each flap mounting a spindle fitting into the reel hub opening. When inserted into the carton, the spine closes the open side of the carton; and the reel is supported between the two flaps by means of the spindles and reel hub. This arrangement allows the reel to rotate freely in the container so as to avoid cinching or buckling of the tape or film that is wound upon the reel, a common hazard when reels are subjected to the shocking accelerations and decelerations of shipping.

However, the standard two-flap shipping insert has certain defects, which the industry has learned to accept but which nevertheless are obviated by the improvements embodied in the present invention.

First, the extending ends of the two flaps are difficult to insert into the open side of the carton: all too easily it happens that the operator succeeds in introducing one but not both of the flaps and must then entirely withdraw the insert and begin again.

Second, the two flaps of the standard shipping container must both be of nearly equal size with the larger sides of the carton, in order to support the reel strongly by the hub for free rotation during shipping, without undue frictional binding of the reel flange peripheries against the sides of the carton. Consequently, there is no way to inspect the reel, or a label on the reel, without wholly withdrawing the insert and the reel from the carton and then folding a flap open to expose the reel label.

Further to disadvantage is the fact that having gone so far to inspect the label one must then face the task of fitting the two awkward ends of the flaps back into the carton.

Accordingly, it is an object of this invention to provide a reel shipping container that may be assembled and closed to protect a reel with improved facility.

It is another object of the present invention to provide a reel shipping container having improved means for viewing the label of a reel contained therein.

THE DRAWINGS

Other objects and advantages of the invention will be disclosed in the following description, and in the drawings, of which:

FIG. 1 is an exploded perspective view illustrating a form of the prior art;

FIG. 2 is an exploded perspective view of an embodiment of the present invention;

FIG. 3 is a cross-sectional view, to an enlarged scale, of the assembled apparatus of the present invention, the planes of section of the various portions of the apparatus being substantially as shown by arrows 3—3 of FIG. 2; and FIG. 4 is a cross-sectional view, on substantially the same plane and scale as that of FIG. 3, showing the apparatus of the invention in partly opened condition.

DESCRIPTION OF THE PREFERRED EMBODIMENTS

Referring now to the drawings and particularly to FIG. 1, thereof, there is shown a shipping container typical of the prior art, for enclosing a reel 11. The container includes a reel-holding insert member 12, formed with two first and second flaps 13 and 15 hingedly and foldably extending from a common first spine 16.

Each flap has mounted thereon a spindle 17 adapted to fit into the reel hub opening 18 when the flap is folded toward the reel, as shown by arrows 19 and 20. The insert 12 may then be slidably inserted into the open side 21 of a carton 22, as shown by the un-numbered arrows. The spine 16 then closes the opening 21. The larger flat sides of the carton 22 may be cut away, as at 23, 23, to facilitate grasping the insert 12 by hand for withdrawing the insert to expose the reel.

It will be clear that the insertion of the insert 12 into the carton 22 is complicated by the need for simultaneously fitting the extending ends of both flaps 13 and 14 into the open end 21 of the carton; and, if only one end is successfully fitted, and the other is not, the entire insert must be withdrawn; and the fitting operation must be begun again.

It should also be clear that the label on the reel cannot be inspected without entirely withdrawing the reel and insert from the carton and folding open one of the flaps; and then, of course, the problem of re-inserting the two flaps of the insert into the open end 21 of the carton must be faced anew.

These difficulties are overcome in the present invention, as shown in FIG. 2, by providing a reel 31 with an insert member 32, comprising first and second flaps 33 and 34 hingedly and foldably secured to a common first spine 36, and each flap 33, 34 mounting a spindle 37 adapted to fit into the hub opening 38 of the reel when the flaps are closed, as illustrated by arrow 39.

Unlike the prior art device, however, the first spine 36 is not used to close the open end 47 of the associated carton 48 when the insert member 32 is inserted into the carton. Instead, spine 36 is oriented to face the opening 47 as the insert member approaches the carton; and, to facilitate the insertion, the spine 36 and adjacent portions of flaps 33, 34 are cut away and tapered as at 44. Now it will be seen that the insert 32 has only a single tapered end to fit into the opening 47 of the carton. To close the opening 47 as the insert rides home, there is provided a second spine 41, opposite the spine 36, and foldably attached to flap 33; and a third flap 42 is foldably attached to spine 41 on the same side of the insert as flap 34. The two flaps 42 and 34 may both be truncated so as to define together substantially the same area as flap 33; but, in any event, flap 34 is the larger and extends toward spine 41 for a dimension that is more than half the diameter of the reel, so as to be able to mount the associated spindle 37. The smaller flap 42 may then be operated as illustrated in FIG. 3, to close the adjacent cut-away hand access opening 49 of the cartion 48; and, as illustrated in FIG. 4, the reel 31 may be inspected by withdrawing the insert only partly from the carton, so as to free the smaller flap 42 to be folded open in the direction of the arrow. Thus, the label of the reel may be inspected quite easily without the need for entire withdrawal of the reel and insert from the carton, and without the need for re-insertion of the insert. As for re-inserting the small flap 42, there is not the problem with this task as there is with the re-insertion of the ends of flaps 13, 14 of the prior art (FIG. 1); for flap 42 has only a single end, which does not have to be aimed at, or coordinated with, any other thing; the insert is already more than half-way into the carton, and its future path is already decided; all that needs to be done is to fold flap 42 solidly against the reel 31 and shove the insert home.

FIGS. 3 and 4 also illustrate the mounting of the spindles 37, which may be made of thin sheet metal and secured by flanges 52 and 53 sandwiching the flaps 33 and 34, respectively. The insert 32 and carton 48 may be made of corrugated paperboard, the pattern of which is illustrated in cross-section in FIGS. 3 and 4. It will also be seen that the spindles 37 may be tapered as tat 51 to facilitate impalement of the reel hub openings 38; and flaps 42 and 34 may also be tapered, as at 46, 46 in FIG. 2, to facilitate insertion and withdrawal of the insert. It will also be understood that only one spindle 37 may be used when convenient, in which case it would be located on the larger flap, i.e. flap 33.

Thus, there has been described a tape reel shipping carton of the type having one open side for the insertion and withdrawal of a reel-holding insert. The insert has a first spine and two flaps bracketing the reel and holding it by means of two opposed spindles extending respectively from the flaps and into the reel hub openings; and a second spine and smaller flap is provided to close the open side of the carton, the smaller flap being easily withdrawn to identify the contents.

What is claimed is:

1. In a reel container of the type including an outer carton having one open side, and being cut away adjacent said open side to facilitate grasping an insert member slidable into said open side of said carton, said member being formed with a first spine and two first and second cover flaps extending therefrom and adapted to mount said reel by means of opposed spindle portions projecting from said flaps and into the hub opening of said reel on opposite sides of said reel, and a spine of said insert member being positionable as a closure for said open side of said carton, the combination comprising:

a second spine for said insert member, said first flap being attached to said second spine for hinged motion with respect thereto; and a third flap hingedly attached to said second spine opposite said first flap;

said third flap being of a size smaller than said first flap but still sufficient to close the adjacent cut-away portion of said carton, so that said third flap may be withdrawn to disclose the identity of the reel without the need for withdrawing the entire insert member.

2. The combination recited in claim 1, wherein the second flap is also smaller in area than the first flap but is of sufficient dimension in the direction of the second spine to cover more than half the area of the first flap, so as to support the associated spindle of the second flap directly opposing the associated spindle of the first flap.

3. The combination recited in claim 2, wherein the third flap is of smaller size than the second flap and is dimensioned to abut the second flap in the closed position of the container so that the second and third flaps together make up the same area as the first flap.

4. The combination recited in claim 3, wherein the abutting corner portions of said second and third flaps are bevel-cut to adapt the second and third flaps for easy insertion and removal into and from the carton.

5. The combination recited in claim 1, wherein the insert corner portions represented by the juncture of the first spine and first and second flaps are bevel-cut to adapt the insert for easy insertion into the carton.

* * * * *